(12) United States Patent
Minamide

(10) Patent No.: US 10,715,688 B2
(45) Date of Patent: Jul. 14, 2020

(54) DISPLAY DEVICE CAPABLE OF NOTIFYING DISPLAY OBJECT BY VOICE, IMAGE PROCESSING APPARATUS, NOTIFYING METHOD, PROCESS EXECUTING METHOD

(71) Applicant: KYOCERA Document Solutions Inc., Osaka-shi, Osaka (JP)

(72) Inventor: Hayato Minamide, Osaka (JP)

(73) Assignee: KYOCERA Document Solutions Inc., Osaka-shi, Osaka (JP)

( * ) Notice: Subject to any disclaimer, the term of this patent is extended or adjusted under 35 U.S.C. 154(b) by 0 days.

(21) Appl. No.: 16/202,717

(22) Filed: Nov. 28, 2018

(65) Prior Publication Data
US 2019/0166267 A1  May 30, 2019

(30) Foreign Application Priority Data

Nov. 29, 2017 (JP) ................. 2017-229089

(51) Int. Cl.
*H04N 1/00* (2006.01)
*G06F 3/0481* (2013.01)
*G06F 3/0488* (2013.01)
*G06F 3/16* (2006.01)

(52) U.S. Cl.
CPC ..... *H04N 1/00411* (2013.01); *H04N 1/00403* (2013.01); *H04N 1/00488* (2013.01); *H04N 1/00824* (2013.01); *G06F 3/0488* (2013.01); *G06F 3/04817* (2013.01); *G06F 3/167* (2013.01)

(58) Field of Classification Search
CPC combination set(s) only.
See application file for complete search history.

(56) References Cited

U.S. PATENT DOCUMENTS

| 2013/0031516 A1* | 1/2013 | Sawayanagi | H04N 1/00411 715/863 |
| 2015/0265920 A1* | 9/2015 | Kim | A63F 13/49 463/31 |
| 2016/0085188 A1* | 3/2016 | Takagi | G03G 15/2042 399/69 |
| 2019/0009773 A1* | 1/2019 | Miyahara | B60W 30/06 |
| 2019/0026011 A1* | 1/2019 | Wang | G06F 3/0488 |

FOREIGN PATENT DOCUMENTS

JP       2002229546 A       8/2002

* cited by examiner

*Primary Examiner* — Helen Zong
(74) *Attorney, Agent, or Firm* — Alleman Hall Creasman & Tuttle LLP

(57) ABSTRACT

A display device includes a display portion, a display processing portion, a detecting portion, and a notification processing portion. The display processing portion displays one or more predetermined display objects on the display portion. The detecting portion detects a shielded area in the display portion shielded by a shielding object. The notification processing portion notifies by voice, among the one or more display objects, a display object that includes an area partially or completely overlapped with the shielded area detected by the detecting portion.

10 Claims, 5 Drawing Sheets

| | TYPE INFORMATION | ADDRESS INFORMATION | COORDINATE INFORMATION |
|---|---|---|---|
| DISPLAY OBJECT T11 | OPERATION ICON | 1011 | (20, 20) |
| DISPLAY OBJECT T12 | MESSAGE | 1012 | (130, 20) |
| DISPLAY OBJECT T13 | OPERATION ICON | 1013 | (20, 70) |
| DISPLAY OBJECT T14 | OPERATION ICON | 1014 | (130, 70) |
| DISPLAY OBJECT T15 | OPERATION ICON | 1015 | (20, 120) |
| DISPLAY OBJECT T16 | OPERATION ICON | 1016 | (130, 120) |

| | NOTIFICATION INFORMATION |
|---|---|
| DISPLAY OBJECT T11 | OPERATION ICON.COPY. |
| DISPLAY OBJECT T12 | MESSAGE.PLEASE INSERT A SHEET. |
| DISPLAY OBJECT T13 | OPERATION ICON. COLOR/MONOCHROME. |
| DISPLAY OBJECT T14 | OPERATION ICON.DENSITY. |
| DISPLAY OBJECT T15 | OPERATION ICON.NUMBER OF PAGES. |
| DISPLAY OBJECT T16 | OPERATION ICON.ENLARGE/REDUCE. |
| ⋮ | ⋮ |

DISPLAY DEVICE CAPABLE OF NOTIFYING DISPLAY OBJECT BY VOICE, IMAGE PROCESSING APPARATUS, NOTIFYING METHOD, PROCESS EXECUTING METHOD

INCORPORATION BY REFERENCE

This application is based upon and claims the benefit of priority from the corresponding Japanese Patent Application No. 2017-229089 filed on Nov. 29, 2017, the entire contents of which are incorporated herein by reference.

BACKGROUND

The present disclosure relates to a display device, an image processing apparatus including the display device, a notifying method executed in the display device, and a process executing method.

In an image processing apparatus such as a multifunctional peripheral, a display portion such as a liquid crystal display may be provided. In addition, in this type of image processing apparatus, a shielding object such as a document sheet may be placed on the display portion, and a portion of a screen displayed on the display portion may be shielded. As a technology to deal with the problem, there is known a display device that can, when a shielded area is detected in the display portion, reduce the screen displayed on the display portion, and display the reduced screen outside the shielded area in the display portion.

SUMMARY

A display device according to an aspect of the present disclosure includes a display portion, a display processing portion, a detecting portion, and a notification processing portion. The display processing portion displays one or more predetermined display objects on the display portion. The detecting portion is configured to detect a shielded area in the display portion shielded by a shielding object. The notification processing portion is configured to notify by voice, among the one or more display objects, a display object that includes an area partially or completely overlapped with the shielded area detected by the detecting portion.

An image processing apparatus according to another aspect of the present disclosure includes the display device, and either or both of an image reading portion configured to read image data of a document sheet, and an image forming portion configured to form an image based on image data.

A notifying method according to a further aspect of the present disclosure, executed in a display device including a display portion and a detecting portion configured to detect a shielded area covered by a shielding object, and includes: displaying one or more predetermined display objects on the display portion; and notifying by voice, among the one or more display objects, a display object that includes an area partially or completely overlapped with the shielded area detected by the detecting portion.

A process executing method according to another aspect of the present disclosure, executed in a display device including a display portion and a detecting portion configured to detect a shielded area in the display portion covered by a shielding object, including: displaying one or more display objects including an operation icon corresponding to a predetermined process on the display portion; notifying by voice, among the one or more display objects, a display object that includes an area partially or completely overlapped with the shielded area detected by the detecting portion; executing the process in response to a touch operation on the operation icon that corresponds to the process; and executing the processes in response to an identification operation performed in a manner different from the touch operation on the display portion, that identifies the operation icon when the operation icon is overlapped with the shielded area.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 5 is a diagram showing an example of screen data used to display a screen in the image processing apparatus according to the embodiment of the present disclosure.

FIG. 6 is a diagram showing an example of read-aloud data used to read aloud a display object in the image processing apparatus according to the embodiment of the present disclosure.

DETAILED DESCRIPTION

The following describes an embodiment of the present disclosure with reference to the accompanying drawings. It should be noted that the following embodiment is an example of a specific embodiment of the present disclosure and should not limit the technical scope of the present disclosure.

[Schematic Configuration of Image Processing Apparatus 10]

Figure 1:
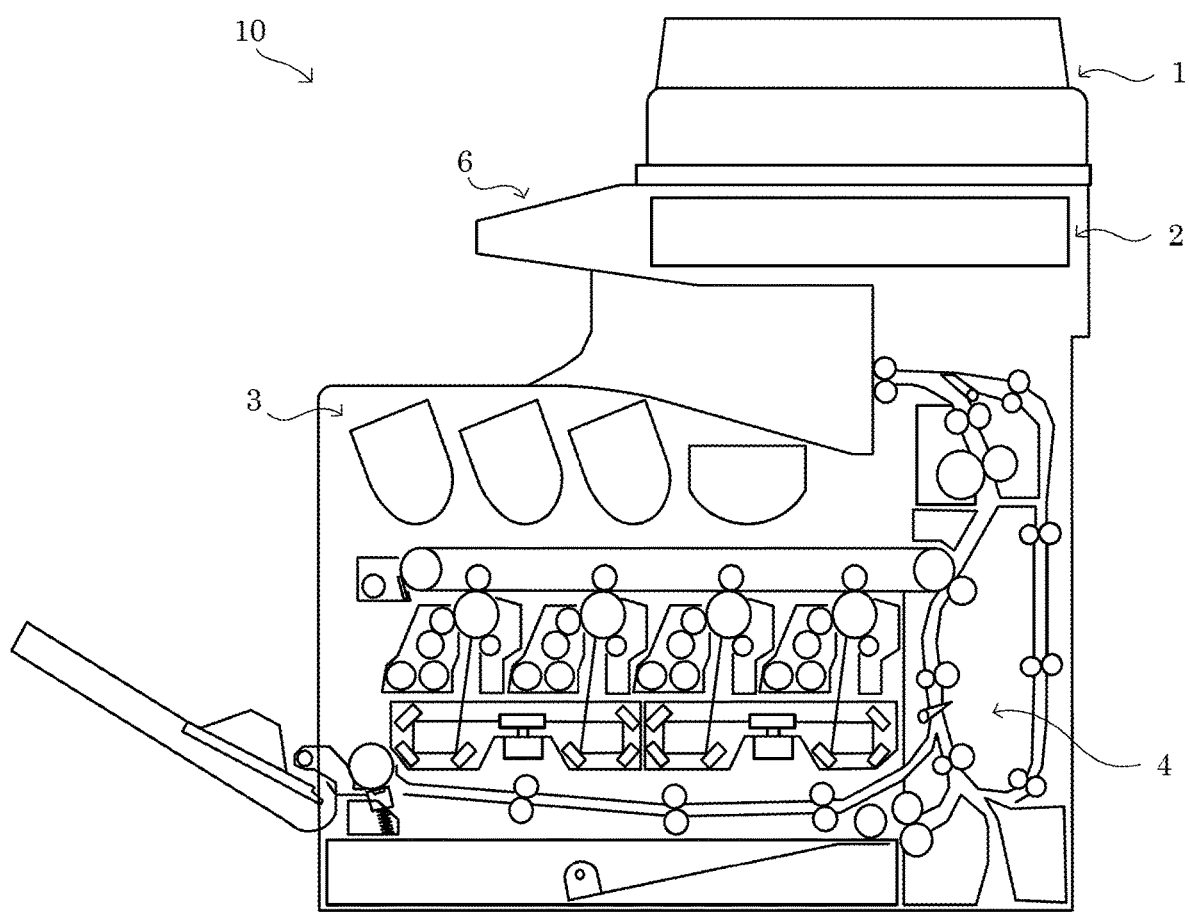
FIG. 1 is a diagram showing a configuration of an image processing apparatus according to an embodiment of the present disclosure.
Figure 2:
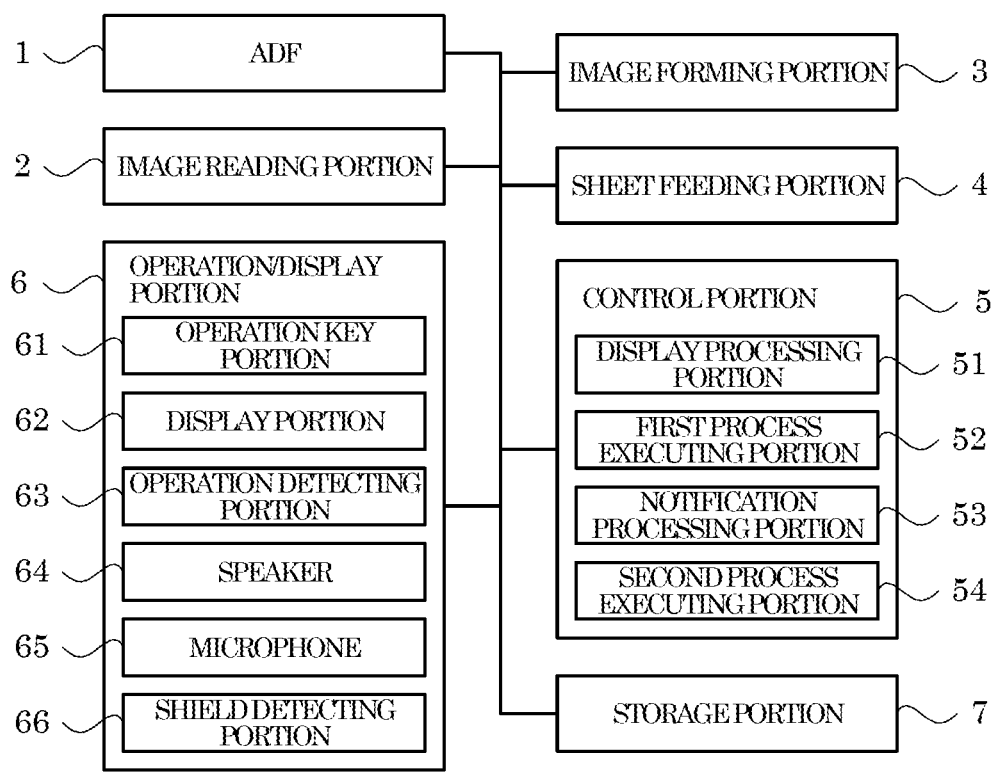
FIG. 2 is a block diagram showing a system configuration of the image processing apparatus according to the embodiment of the present disclosure.
Figure 3:
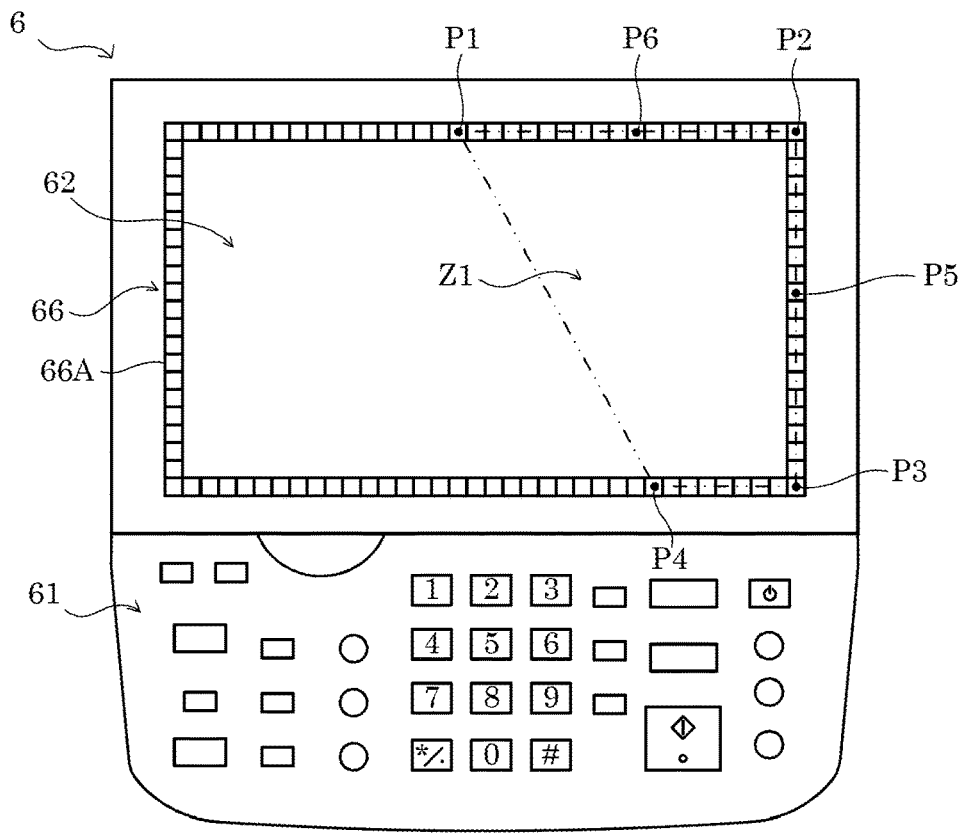
FIG. 3 is a diagram showing a configuration of an operation/display portion of the image processing apparatus according to the embodiment of the present disclosure.

First, with reference to FIG. 1 to FIG. 3, a description is given of a schematic configuration of an image processing apparatus 10 according to an embodiment of the present disclosure. Here, FIG. 1 is a schematic cross-sectional diagram showing the configuration of the image processing apparatus 10. In addition, FIG. 3 is a plan diagram showing a configuration of an operation/display portion 6. It is noted that a two-dot chain line in FIG. 3 indicates a shielded area Z1.

The image processing apparatus 10 is a multifunctional peripheral having a plurality of functions, such as a scanning function for reading image data from a document sheet, a printing function for forming an image based on image data, a facsimile function, and a copying function. It is noted that the image processing apparatus 10 may be a scanner apparatus, a printer apparatus, a facsimile apparatus, or a copier.

As shown in FIG. 1 and FIG. 2, the image processing apparatus 10 includes an ADF (Automatic Document Feeder) 1, an image reading portion 2, an image forming portion 3, a sheet feeding portion 4, a control portion 5, an operation/display portion 6, and a storage portion 7.

The ADF 1 conveys a document sheet to be read by the image reading portion 2. Specifically, the ADF 1 includes a document sheet setting portion, a plurality of conveyance rollers, a document sheet holder, and a sheet discharge portion.

The image reading portion 2 can read image data from the document sheet. Specifically, the image reading portion 2 includes a document sheet table, a light source, a plurality of mirrors, an optical lens, and a CCD.

The image forming portion 3 is configured to electrographically form a color or monochrome image based on the image data read by the image reading portion 2. In addition, the image forming portion 3 may be configured to form an image based on image data input from an information processing apparatus such as an external personal computer. Specifically, the image forming portion 3 includes a plurality of image forming units corresponding to C (cyan), M (magenta), Y (yellow), and K (black), a laser scanning unit (LSU), an intermediate transfer belt, a secondary transfer roller, a fixing device, and a sheet discharge tray. It is noted that the image forming portion 3 may form an image by another image forming method, such as an ink jet method.

The sheet feeding portion 4 supplies a sheet to the image forming portion 3. Specifically, the sheet feeding portion 4 includes a sheet feeding cassette and a plurality of conveyance rollers. In the image processing apparatus 10, the color or monochrome image is formed on the sheet supplied from the sheet feeding portion 4, and the sheet on which the image has been formed is discharged to the sheet discharge tray.

The control portion 5 includes control devices such as a CPU, a ROM, a RAM, and an EEPROM, all of which are not shown. The CPU is a processor for executing various types of arithmetic processing. The ROM is a nonvolatile storage device in which information, such as a control program for the CPU to execute the various types of processing, is preliminarily stored. The RAM is a volatile storage device, and the EEPROM is a nonvolatile storage device. The RAM and the EEPROM are used as temporary storage memory (work area) for the various types of processing executed by the CPU. In the control portion 5, various types of control programs, preliminarily stored in the ROM, are executed by the CPU. This allows for the image processing apparatus 10 to be integrally controlled by the control portion 5. It is noted that the control portion 5 may be constituted by an electronic circuit such as an integrated circuit (ASIC), and may be provided separately from a main control portion that integrally controls the image processing apparatus 10.

The operation/display portion 6 is a user interface of the image processing apparatus 10. As shown in FIG. 2 and FIG. 3, the operation/display portion 6 includes an operation key portion 61, a display portion 62, an operation detecting portion 63, a speaker 64, a microphone 65, and a shield detecting portion 66.

The operation key portion 61 includes a plurality of hard keys for inputting various types of information to the control portion 5 in response to a user operation. For example, the operation key portion 61 may include a power key used for controlling power supply to the devices in the image processing apparatus 10, a start key used for commanding execution of various jobs, and a ten-key used for inputting numeric information (see FIG. 3).

The display portion 62 displays various types of information in response to a control command from the control portion 5. For example, the display portion 62 may be a liquid crystal display. For example, the display portion 62 may display a screen G10 (see FIG. 4) used for setting operations of a copy job executed in the image processing apparatus 10.

The operation detecting portion 63 is a touch panel configured to detect an operation by a user on the display portion 62. For example, when an object such as a user's finger comes in contact with the display portion 62, the operation detecting portion 63 detect a contact position (touch position) of the object on the display portion 62 by a resistive film system. It is noted that the operation detecting portion 63 may detect contact of the object with the display portion 62 using another detection system, such as an electrostatic capacitance system.

The speaker 64 is used for sounding an alarm, outputting voice data, or the like.

The microphone 65 is used for inputting a voice to the image processing apparatus 10.

The shield detecting portion 66 can detect a shielded area in the display portion 62 that is covered by a shielding object. Here, the shield detecting portion 66 is an example of a detecting portion in the present disclosure.

For example, as shown in FIG. 3, the shield detecting portion 66 is disposed adjacently to an edge portion of the display portion 62, and includes a plurality of sensors 66A provided side by side along the edge portion. For example, the sensors 66A are reflective optical sensors with light emitting portions and light receiving portions.

For example, when the light receiving portions of some of the sensors 66A receive light of a quantity exceeding a predetermined threshold, the shield detecting portion 66 detects the shielded area based on positions of the sensors 66A with the light receiving portions that have received light of a quantity exceeding the threshold.

For example, in FIG. 3, it is assumed that light of a quantity exceeding the threshold has been received by the light receiving portions of the sensors 66A disposed along straight lines connecting a position P1 and a position P2, a position P2 and a position P3, and a position P3 and a position P4. In this case, the shield detecting portion 66 detects a rectangular area surrounded by the straight lines connecting the position P1 and the position P2, the position P2 and the position P3, the position P3 and the position P4, and the position P4 and the position P1, as the shielded area Z1 (see FIG. 3). It is noted that the shield detecting portion 66 may detect a rectangular area whose corners include the position P1, the position P2, and the position P3 as the shielded area. In addition, the shield detecting portion 66 may detect a rectangular area whose corners include the position P2, the position P3, and the position P4 as the shielded area.

In addition, in FIG. 3, it is assumed that light of a quantity exceeding the threshold has been received by the light receiving portions of the sensors 66A disposed along straight lines connecting the position P1 and the position P2, and the position P2 and a position P5. In this case, the shield detecting portion 66 detects a triangular area surrounded by the straight lines connecting the position P1 and the position P2, the position P2 and the position P5, and the position P5 and the position P1, as the shielded area. It is noted that the shield detecting portion 66 may detect a rectangular area whose corners include the position P1, the position P2, and the position P5 as the shielded area.

In addition, in FIG. 3, it is assumed that light of a quantity exceeding the threshold has been received by the light receiving portions of the sensors 66A disposed along a straight line connecting the position P1 and a position P6. In this case, the shield detecting portion 66 detects, as the shielded area, a square area overlapped with a display area of the display portion 62, whose one side is the straight line connecting the position P1 and the position P6. It is noted that the shield detecting portion 66 may detect, as the shielded area, a rectangular area overlapped with the display area of the display portion 62, whose one side is the straight line connecting the position P1 and the position P6.

It is noted that the sensors 66A may be optical sensors having only light receiving portions. In addition, the sensors 66A may be pressure-sensitive sensors. In addition, the operation detecting portion 63 may also serve as the shield detecting portion 66. In addition, the shield detecting portion 66 may detect the shielded area by a method different from the methods described above.

The storage portion 7 is a nonvolatile storage device. For example, the storage portion 7 may be a flash memory, an SSD (Solid State Drive), or an HDD (Hard Disk Drive). The storage portion 7 stores image data that is read by the image reading portion 2. It is noted that the storage portion 7 may be the EEPROM of the control portion 5.

Meanwhile, in the image processing apparatus 10, when the shielding object such as a document sheet is placed on the display portion 62, a portion of a screen displayed on the display portion 62 may be shielded. As a technology to deal with this problem, there is known a display device that is configured to reduce the screen displayed on the display portion 62, and display the reduced screen outside the shielded area in the display portion 62 when the shielded area is detected.

However, in the case of the technology where the screen displayed on the display portion 62 is reduced and displayed outside the shielded area in the display portion 62 when the shielded area is detected, the display content that had been displayed outside the shielded area before the shielded area was detected becomes less visible. On the other hand, in the image processing apparatus 10 according to the embodiment of the present disclosure as described below, the display content in the shielded area can be made recognizable by a user without reducing the visibility of the display content outside the shielded area.

Specifically, a notification program configured to make the CPU of the control portion 5 execute a notifying process (see flowchart in FIG. 7) described below, is preliminarily stored in the ROM of the control portion 5. It is noted that the notification program is stored in a computer-readable recording medium such as a CD, a DVD, and a flash memory, and may be installed from the recording medium into a storage device such as the storage portion 7.

As shown in FIG. 2, the control portion 5 includes a display processing portion 51, a first process executing portion 52, a notification processing portion 53, and a second process executing portion 54. Specifically, the CPU of the control portion 5 executes the notification program stored in the ROM. This allows for the control portion 5 to function as the display processing portion 51, the first process executing portion 52, the notification processing portion 53, and the second process executing portion 54. Here, the structure including the control portion 5 and the operation/display portion 6 is an example of a display device in the present disclosure.

The display processing portion 51 is configured to display one or more predetermined display objects on the display portion 62. For example, the display objects may include an operation icon corresponding to a predetermined process. In addition, the display objects may include a message image showing a message to a user. It is noted that the display objects may include a digital clock showing the current time.

For example, when a predetermined display condition is satisfied, the display processing portion 51 displays, on the display portion 62, a screen including one or more display objects and corresponding to the predetermined display condition. In the image processing apparatus 10, multiple pieces of screen data are preliminarily stored in the ROM of the control portion 5 respectively in correspondence to a plurality of the display conditions. When one of the display conditions is satisfied, the display processing portion 51 displays a screen based on one of the multiple pieces of screen data corresponding to the satisfied display condition.

Figure 4:
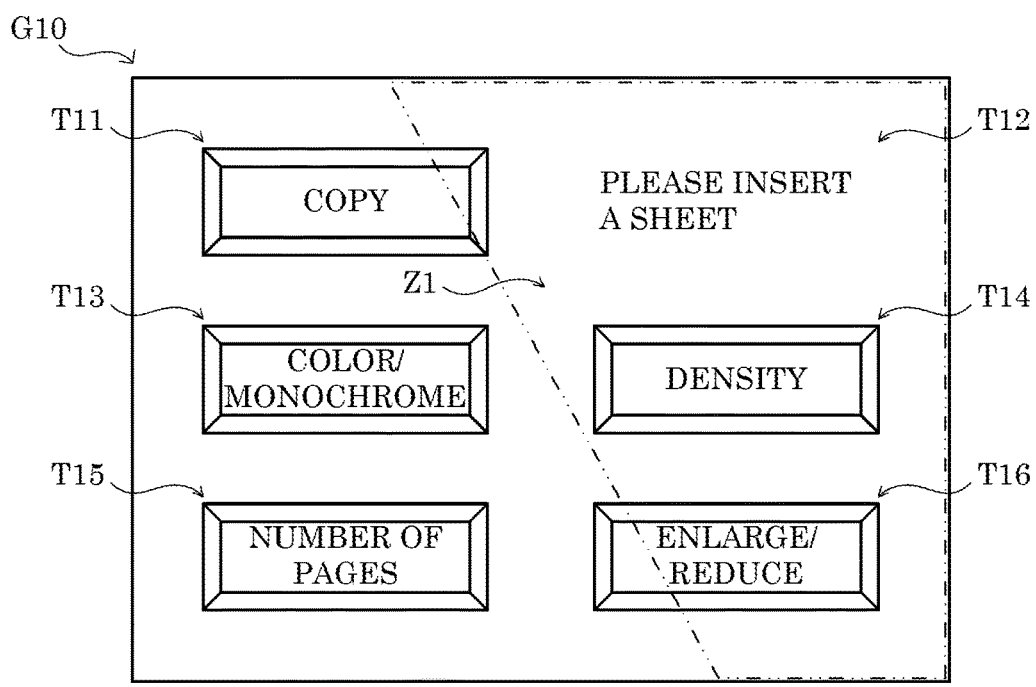
FIG. 4 is a diagram showing an example of a screen displayed on the operation/display portion of the image processing apparatus according to the embodiment of the present disclosure.

Here, FIG. 4 shows a screen G10 that is an example of the screen displayed on the display portion 62 by the display processing portion 51. As shown in FIG. 4, the screen G10 includes a plurality of display objects T11 to T16. The display object T11 and the display objects T13 to T16 are operation icons. In addition, the display object T12 is a message image. It is noted that the screen G10 is displayed when a copy job is chosen on a job selection screen displayed on the display portion 62 when, for example, the image processing apparatus 10 is turned on.

In addition, FIG. 5 shows screen data D10 that is an example of the screen data used by the display processing portion 51 to display the screen G10. As shown in FIG. 5, the screen data D10 includes type information, address information, and coordinate information for the display objects T11 to T16. The type information indicates types of the display objects T11 to T16. The address information indicates addresses of image data of the display objects T11 to T16 that are preliminarily stored in the ROM of the control portion 5. The coordinate information indicates display positions of the display objects T11 to T16 in the display portion 62.

For example, when displaying the screen G10 on the display portion 62, the display processing portion 51 first reads the screen data D10 from the ROM of the control portion 5. Next, the display processing portion 51 acquires the image data of the display objects T11 to T16 based on the address information included in the screen data D10. Then, the display processing portion 51 displays the acquired image data at positions specified by the coordinate information included in the screen data D10 on the display portion 62.

In response to a touch operation on one of the operation icons, the first process executing portion 52 executes a process corresponding to the one operation icon on which the touch operation was performed.

Specifically, when the touch operation has been detected on the display portion 62 by the operation detecting portion 63, the first process executing portion 52 determines whether or not an operation icon is displayed at a position where the touch operation was detected, based on the type information and the coordinate information included in the screen data. When it is determined that an operation icon is displayed at the position where the touch operation was detected, the first process executing portion 52 executes the process corresponding to the operation icon whose operation was detected.

For example, when a touch operation is detected on the display object T11 of the screen G10 shown in FIG. 4, the first process executing portion 52 executes the copy job. In addition, when a touch operation is detected on the display object T14 of the screen G10, the first process executing portion 52 displays a density setting screen used for setting a print density on the display portion 62.

The notification processing portion 53 is configured to, when some of the display objects are partially or completely overlapped with the shielded area detected by the shield detecting portion 66, notify the overlapped display objects by voice.

For example, the notification processing portion 53 may notify, by voice, one or more display objects that each have a percentage of area overlapped with the shielded area that is greater than or equal to a predetermined threshold. For example, the threshold may be 30 percent. It is noted that the threshold may be an arbitrarily set value.

For example, when the shielded area is detected by the shield detecting portion 66, the notification processing portion 53 determines whether or not each of the display objects are overlapped with the shielded area based on the coordinate information and image data of the display objects. In addition, with respect to each of the display objects determined to be overlapped with the shielded area, the notification processing portion 53 determines whether or not a percentage of area overlapped with the shielded area is greater than or equal to the predetermined threshold. Then, the notification processing portion 53 notifies, by voice, the display objects that each have a percentage of area overlapped with the shielded area that is greater than or equal to the predetermined threshold. It is noted that when there is more than one display object to be notified by voice, the notification processing portion 53 notifies the display objects sequentially.

For example, in the image processing apparatus 10, read-aloud data is preliminarily stored in the storage portion 7, wherein the read-aloud data includes a plurality of pieces of notification information which respectively correspond to the display objects and each indicate a piece of voice notification content. When notifying a display object by voice, the notification processing portion 53 acquires a piece of the notification information corresponding to the display object from the read-aloud data. Then, after converting the acquired notification information to a voice signal, the notification processing portion 53 outputs the signal to the speaker 64.

For example, when the shielded area Z1 shown in FIG. 3 and FIG. 4 is detected in the screen G10 shown in FIG. 4, the notification processing portion 53 identifies the display object T11, the display object T12, the display object T14, and the display object T16 as the display objects overlapped with the shielded area Z1. In addition, the notification processing portion 53 determines that the display object T12, the display object T14, and the display object T16 are display objects that each have a percentage of area overlapped with the shielded area that is greater than or equal to the predetermined threshold. Then, the notification processing portion 53 acquires the notification information corresponding to the display object T12, the display object T14, and the display object T16 from the read-aloud data, and performs voice notification based on the acquired notification information.

FIG. 6 shows read-aloud data D20 that is an example of read-aloud data. For example, as shown in FIG. 6, the notification information may include type information and text information, the type information indicating the type of each of the display objects, and the text information indicating characters included in the image data of each of the display objects (see FIG. 4).

It is noted that the notification processing portion 53 may notify, by voice, all of the display objects overlapped with the shielded area.

The second process executing portion 54 is configured to execute a process corresponding to the operation icon identified by an identification operation that is performed in a different manner from the touch operation to identify the operation icon overlapped with the shielded area.

For example, when the shielded area is detected by the shield detecting portion 66, the second process executing portion 54 executes the process corresponding to the operation icon identified by the identification operation, in response to the identification operation. It is noted that the second process executing portion 54 may execute the process corresponding to the operation icon identified by the identification operation in response to the identification operation, even when the shielded area is not detected by the shield detecting portion 66.

For example, the identification operation may include an operation input by voice to the image processing apparatus 10. For example, the identification operation may be an operation of inputting, by voice, a predetermined word such as "OK" or "yes" during a predetermined waiting time starting from a time when the operation icon to be operated is finished being read aloud by the notification processing portion 53.

It is noted that the identification operation may be an operation of inputting, by voice, a portion or all of the text information corresponding to the operation icon to be operated.

In addition, the identification operation may be an operation on a predetermined operation key. For example, the identification operation may be an operation on a predetermined operation key of the operation key portion 61 performed during the predetermined waiting time starting from the time when the operation icon to be operated is finished being read aloud by the notification processing portion 53. In addition, the identification operation may be an operation on a ten-key of a number indicating an order in which the operation icon to be operated is to be read aloud by the notification processing portion 53. In addition, the identification operation may include both the input operation by voice to the image processing apparatus 10, and the operation on the predetermined operation key.

Here, the notification processing portion 53 notifies the display object as well as a method of the identification operation by voice. It is noted that the notification processing portion 53 may not notify the identification operation by voice.

It is further noted that the control portion 5 may not include the first process executing portion 52 and the second process executing portion 54.

[Notifying Process]

Figure 7:
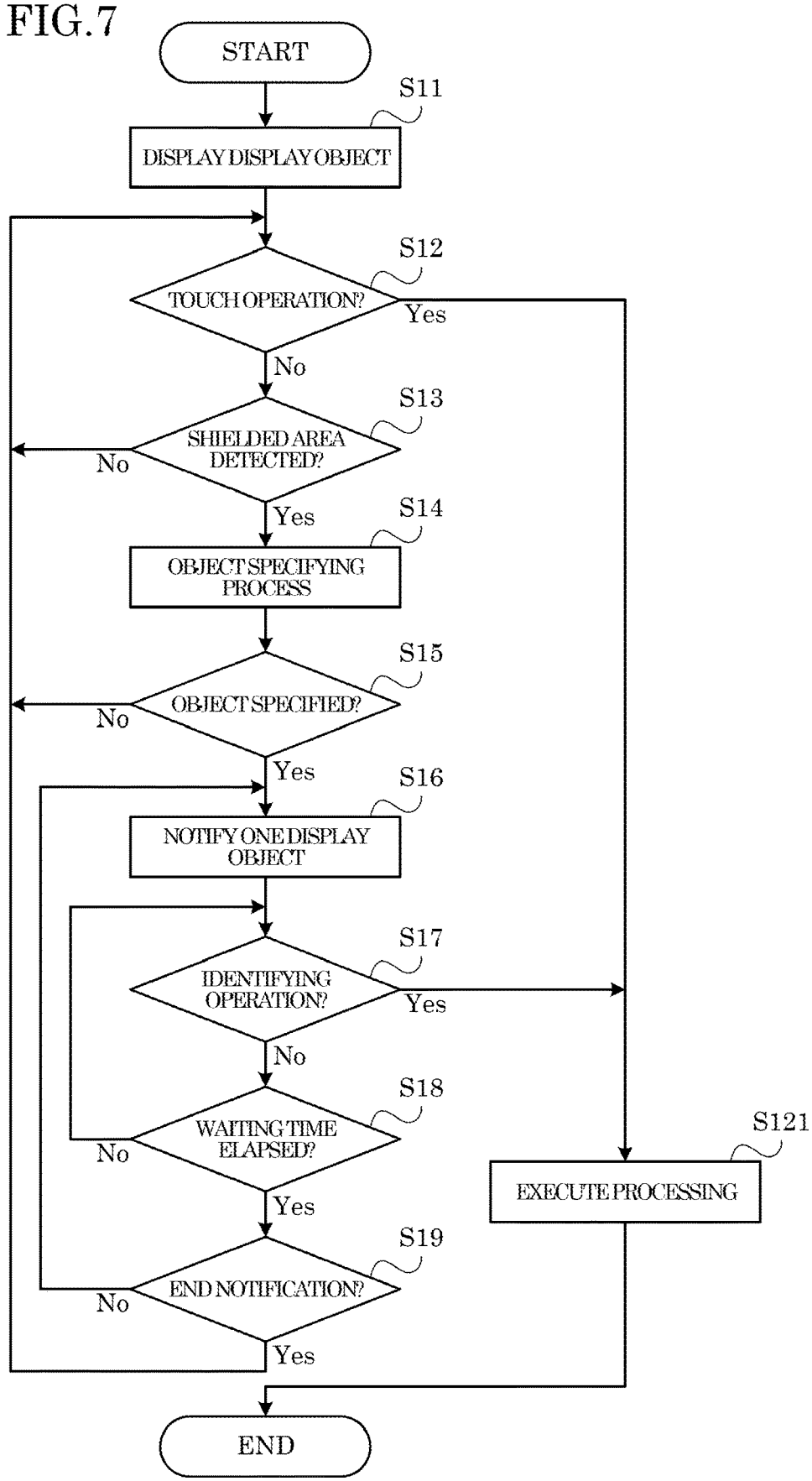
FIG. 7 is a flowchart showing an example of a notifying process executed in the image processing apparatus according to the embodiment of the present disclosure.

Below, with reference to FIG. 7, a description is given of an example procedure of a notifying process executed by the control portion 5 in the image processing apparatus 10. Here, steps S11, S12 . . . indicate the numbers of processing procedures (steps) executed by the control portion 5. It is noted that the notifying process executed when the control portion 5 determines that the display condition has been satisfied.

<Step S11>

First, in step S11, the control portion 5 displays the display object on the display portion 62. Here, processing in step S11 is executed by the display processing portion 51 of the control portion 5.

Specifically, the control portion 5 displays the screen on the display portion 62 based on the screen data corresponding to the display condition that was determined to be satisfied immediately before execution of the notifying process.

<Step S12>

In step S12, the control portion 5, using the operation detecting portion 63, determines whether or not the touch operation has been performed on the operation icon included in the screen displayed in step S11.

Specifically, when the touch operation on the display portion 62 has been detected by the operation detecting portion 63, the control portion 5 determines whether or not the operation icon is displayed at a position where the touch operation was detected, based on the type information and coordinate information included in the screen data. When the control portion 5 determines that the operation icon is displayed at the position where the touch operation was detected, the control portion 5 determines that the touch operation has been performed on the operation icon.

Here, when the control portion 5 determines that the touch operation has been performed on the operation icon (Yes in S12), the control portion 5 moves the process to step S121. In addition, when the control portion 5 determines that the touch operation has not been performed on the operation icon (No in S12), the control portion 5 moves the process to step S13.

<Step S121>

In step S121, the control portion 5 executes the process corresponding to the operation icon on which the touch operation was determined to have been performed in step S12. Then, the control portion 5 ends the notifying process. Here, processing in steps S12 and S121 are executed by the first process executing portion 52 of the control portion 5. It is noted that when a new screen including the display object is displayed in accordance with the execution of the process corresponding to the operation icon, the control portion 5 determines that the display condition has been satisfied, and executes the notifying process corresponding to the new screen. On the other hand, when a new screen not including the display object is displayed on the display portion 62 in accordance with the execution of the process corresponding to the operation icon, since the display condition is not satisfied, the notifying process is not executed.

<Step S13>

In step S13, the control portion 5 determines whether or not the shielded area has been detected by the shield detecting portion 66.

Here, when the control portion 5 determines that the shielded area has been detected by the shield detecting portion 66 (Yes in S13), the control portion 5 moves the process to step S14. In addition, when the control portion 5 determines that the shielded area has not been detected by the shield detecting portion 66 (No in S13), the control portion 5 moves the process to step S12, and waits for the detection of the touch operation on the operation icon and the detection of the shielded area.

<Step S14>

In step S14, the control portion 5 executes an object specifying process for specifying the display object to be notified.

For example, in the object specifying process, it is determined whether or not the shielded area detected in step S13 is overlapped with each of the display objects, based on the coordinate information and image data of the display objects. In addition, in the object specifying process, it is determined with respect to one or more display objects determined to be overlapped with the shielded area, whether or not a percentage of area overlapped with the shielded area is greater than or equal to the predetermined threshold. Then, in the object specifying process, one or more display objects that have been determined to each have a percentage of area overlapped with the shielded area that is greater than or equal to the predetermined threshold are specified as the display objects to be notified.

Here, in the notifying process, only the one or more display objects determined to each have a percentage of area overlapped with the shielded area that is greater than or equal to the predetermined threshold are notified by voice. With this configuration, it is possible to avoid performing voice notification even of a display object with a small area shielded by the shielding object.

<Step S15>

In step S15, the control portion 5 determines whether or not the display object to be notified has been specified by the object specifying process executed in step S14.

Here, when the control portion 5 determines that the display object to be notified has been specified by the object specifying process (Yes in S15), the control portion 5 moves the process to step S16. In addition, when the control portion 5 determines that the display object to be notified has not been specified by the object specifying process (No in S15), the control portion 5 moves the process to step S12.

<Step S16>

In step S16, the control portion 5 notifies one of the display objects specified as the display object to be notified in the object specifying process executed in step S14. Here, processing in steps S14 to S16 are executed by the notification processing portion 53 of the control portion 5.

For example, the control portion 5 may acquire the notification information corresponding to the display object to be notified included in the read-aloud data. Then, the control portion 5 converts the acquired notification information to the voice signal, and outputs the voice signal to the speaker 64.

It is noted that the control portion 5 may notify the method of the identification operation before the first display object is notified. This allows for a user to recognize the method of the identification operation.

<Step S17>

In step S17, the control portion 5 determines whether or not the identification operation has been performed.

For example, when a voice input of the predetermined word such as "OK" or "yes" is detected by the microphone 65, the control portion 5 determines that the identification operation has been performed.

Here, when the control portion 5 determines that the identification operation has been performed (Yes in S17), the control portion 5 moves the process to step S121. In this case, a process corresponding to the display object notified immediately before the identification operation is executed in step S121. Here, processing in steps S17 and S121 following the execution of processing in step S16 is executed by the second process executing portion 54 of the control portion 5. In addition, when the identification operation is not performed (No in S17), the control portion 5 moves the process to step S18.

<Step S18>

In step S18, the control portion 5 determines whether or not the waiting time has elapsed.

Here, when the control portion 5 determines that the waiting time has elapsed (Yes in S18), the control portion 5 moves the process to step S19. In addition, when the waiting time has not elapsed yet (No in step S18), the control portion 5 moves the process to step S17, and waits for the identification operation and for the waiting time to elapse.

<Step S19>

In step S19, the control portion 5 determines whether or not processing in step S16 has been executed for all of the display objects specified in the object specifying process executed in step S14.

Here, when the control portion 5 determines that the processing in step S16 has been executed for all of the display objects (Yes in step S19), the control portion 5 moves the process to step S12. In addition, when the processing in step S16 has not been executed for all of the display objects (No in step S19), the control portion 5 moves the process to step S16. In this case, in step S16, notification of the one or more display objects that have not been notified yet is performed.

As described above, in the image processing apparatus 10, when the shielded area is detected by the shield detecting portion 66, the display object(s) partially or completely overlapped with the shielded area is notified by voice. This allows for the display content in the shielded area to be recognized by a user without reducing visibility of the display content outside the shielded area.

In addition, in the image processing apparatus 10, a process corresponding to the operation icon identified by the identification operation is executed, in response to the identification operation performed in a manner different from the touch operation. This allows for the user to perform an operation on the operation icon overlapped with the shielded area without removing the shielding object.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. A display device, comprising:
a display portion;
a display processing portion configured to display, on the display portion, a plurality of predetermined display objects including an operation icon corresponding to a predetermined process;
a first process executing portion configured to execute the predetermined process in response to a touch operation on the operation icon;
a detecting portion configured to detect, by using a plurality of sensors provided side by side along an edge portion of the display portion, a shielded area in the display portion shielded by a shielding object, the shielded area including at least a part of the edge portion, the detecting portion being provided independently of a touch panel that is configured to detect an operation performed on the display portion;
a notification processing portion configured to notify by voice, among the plurality of predetermined display objects, a display object that includes a display area partially or completely overlapped with the shielded area detected by the detecting portion; and
a storage portion configured to store a plurality of pieces of notification information which are preliminarily made to respectively correspond to the display objects and each indicate a piece of voice notification content, wherein
the display objects each include text information indicating content of the respective display objects,
the notification information includes the text information included in each of the display objects, and
the notification processing portion is configured to:
acquire, when the display object including the display area partially or completely overlapped with the shielded area detected by the detecting portion is displayed, the piece of notification information corresponding to the display object,
notify the display object by voice based on the acquired piece of notification information, and
notify, when there are multiple display objects to be notified by voice, the multiple display objects sequentially.

2. The display device according to claim 1, further comprising:
a second process executing portion configured to execute, in response to an identification operation performed in a manner different from the touch operation on the display portion that identifies the operation icon when the operation icon is overlapped with the shielded area, the predetermined process corresponding to the operation icon identified by the identification operation, wherein
each time the notification processing portion notifies the operation icon, the second process executing portion waits for the identification operation that identifies the operation icon during a predetermined waiting time starting from a time when the operation icon is finished being notified.

3. The display device according to claim 2, wherein the identification operation includes an operation input by voice to the display device.

4. The display device according to claim 2, wherein the identification operation includes an operation on a predetermined operation key.

5. The display device according to claim 2, wherein the notification processing portion notifies a method of the identification operation by voice.

6. The display device according to claim 1, wherein the notification processing portion notifies, by voice, the display object that has a percentage of area overlapped with the shielded area that is greater than or equal to a predetermined threshold.

7. An image processing apparatus, comprising:
the display device according to claim 1; and
either or both of an image reading portion configured to read image data of a document sheet, and an image forming portion configured to form an image based on image data.

8. A notifying method executed in a display device including a display portion and a detecting portion, the detecting portion configured to detect, by using a plurality of sensors provided side by side along an edge portion of the display portion, a shielded area in the display portion shielded by a shielding object, the shielded area including at least a part of the edge portion, the detecting portion being provided independently of a touch panel that is configured to detect an operation performed on the display portion, comprising:

displaying, on the display portion, a plurality of predetermined display objects including an operation icon corresponding to a predetermined process;
executing the predetermined process in response to a touch operation on the operation icon; and
notifying by voice, among the plurality of predetermined display objects, a display object that includes a display area partially or completely overlapped with the shielded area detected by the detecting portion, wherein
the display device includes a storage portion configured to store a plurality of pieces of notification information which are preliminarily made to respectively correspond to the display objects and each indicate a piece of voice notification content,
the display objects each include text information indicating content of the respective display objects,
the notification information includes the text information included in each of the display objects, and
the notifying method includes:
  acquiring, when the display object including the display area partially or completely overlapped with the shielded area detected by the detecting portion is displayed, the piece of notification information corresponding to the display object,
  notifying the display object by voice based on the acquired piece of notification information, and
  notifying, when there are multiple display objects to be notified by voice, the multiple display objects sequentially.

9. A process executing method executed in a display device including a display portion and a detecting portion, the detecting portion configured to detect, by using a plurality of sensors provided side by side along an edge portion of the display portion, a shielded area in the display portion shielded by a shielding object, the shielded area including at least a part of the edge portion, the detecting portion being provided independently of a touch panel that is configured to detect an operation performed on the display portion, comprising:
  displaying a plurality of display objects including an operation icon corresponding to a predetermined process on the display portion;
  notifying by voice, among the plurality of display objects, a display object that includes a display area partially or completely overlapped with the shielded area detected by the detecting portion;
  executing the process in response to a touch operation on the operation icon that corresponds to the process; and
  executing, in response to an identification operation performed in a manner different from the touch operation on the display portion that identifies the operation icon when the operation icon is overlapped with the shielded area, the process corresponding to the operation icon identified by the identification operation, wherein
  the display device includes a storage portion configured to store a plurality of pieces of notification information which are preliminarily made to respectively correspond to the display objects and each indicate a piece of voice notification content,
  the display objects each include text information indicating content of the respective display objects,
  the notification information includes the text information included in each of the display objects, and
  the process executing method includes:
    acquiring, when the display object including the display area partially or completely overlapped with the shielded area detected by the detecting portion is displayed, the piece of notification information corresponding to the display object,
    notifying the display object by voice based on the acquired piece of notification information,
    notifying, when there are multiple display objects to be notified by voice, the multiple display objects sequentially, and
    each time the operation icon is notified, waiting for the identification operation that identifies the operation icon during a predetermined waiting time starting from a time when the operation icon is finished being notified.

10. The process executing method according to claim 9, wherein
the identification operation includes either or both of an operation input by voice to the display device, and an operation on a predetermined operation key.

* * * * *